(12) United States Patent
Meraz et al.

(10) Patent No.: US 12,440,988 B2
(45) Date of Patent: Oct. 14, 2025

(54) SYSTEMS AND METHODS FOR MANIPULATING CONTROL PANELS USING ROBOTIC ARMS BASED ON CONTROL SYSTEM DATA ANALYTICS

(71) Applicant: Aquila Engineering LLC, Houston, TX (US)

(72) Inventors: Jose Meraz, Houston, TX (US); Andrew James Pratt, The Woodlands, TX (US)

(73) Assignee: Aquila Engineering LLC, Houston, TX (US)

( * ) Notice: Subject to any disclaimer, the term of this patent is extended or adjusted under 35 U.S.C. 154(b) by 127 days.

(21) Appl. No.: 17/581,095

(22) Filed: Jan. 21, 2022

(65) Prior Publication Data

US 2022/0234202 A1 Jul. 28, 2022

Related U.S. Application Data (60) Provisional application No. 63/140,447, filed on Jan. 22, 2021.

(51) Int. Cl.
*B25J 9/16* (2006.01)

(52) U.S. Cl.
CPC ........... *B25J 9/1674* (2013.01); *B25J 9/1664* (2013.01); *B25J 9/1679* (2013.01); *B25J 9/1697* (2013.01)

(58) Field of Classification Search
CPC ......... G05B 19/409; G05B 2219/40041; B25J 9/1664; B25J 9/1674; B25J 9/1679;
(Continued)

(56) References Cited

U.S. PATENT DOCUMENTS 11,011,077 B2  5/2021  Kilroy et al.
11,637,716 B1 *  4/2023  Kerzner .............. H04L 12/2816
(Continued)

FOREIGN PATENT DOCUMENTS

CN     111531531 A  *  8/2020  ............ B25J 9/1612
EP      3070548 A2  *  9/2016  ............ G05B 11/01

OTHER PUBLICATIONS

F. Wang, G. Chen and K. Hauser, "Robot Button Pressing in Human Environments, " 2018 IEEE International Conference on Robotics and Automation (ICRA), Brisbane, QLD, Australia, 2018, pp. 7173-7180, doi: 10.1109/ICRA.2018.8463180. (Year: 2018).*

(Continued)

*Primary Examiner* — Adam R Mott
*Assistant Examiner* — James Miller Watts, III
(74) *Attorney, Agent, or Firm* — Fletcher Yoder P.C.

(57) ABSTRACT

Systems and methods presented herein utilize one or more robotic arms and a data analytics server in conjunction with existing control systems. The data analytics server is configured to receive operational data relating to operation of industrial equipment being controlled by a control system. The data analytics server is also configured to perform data analytics on the operational data. The data analytics server is further configured to determine one or more control signals configured to cause the one or more robotic arms to automatically manipulate one or more control elements of a control panel of the control system. In addition, the data analytics server is configured to automatically transmit the one or more control signals to the one or more robotic arms to cause the one or more robotic arms to automatically manipulate the one or more control elements of the control panel of the control system.

17 Claims, 5 Drawing Sheets

(58) Field of Classification Search
CPC ......... B25J 9/1697; F03B 13/02; F04B 47/00;
E21B 43/00; E21B 7/04; E21B 47/003;
E21B 7/00; E32B 44/04
See application file for complete search history.

(56) References Cited

U.S. PATENT DOCUMENTS

| | | | |
|---|---|---|---|
| 2015/0057961 A1* | 2/2015 | Montoya | G06F 11/2294 |
| 2016/0121479 A1* | 5/2016 | Lin | B25J 9/0003 |
| 2016/0282847 A1* | 9/2016 | Germann | G05B 23/0243 |
| 2017/0173795 A1* | 6/2017 | Tan | B25J 9/1697 |
| 2019/0167068 A1* | 6/2019 | Yoon | A47L 15/24 |
| 2019/0287063 A1* | 9/2019 | Skaaksrud | G07C 9/27 |
| 2021/0006425 A1* | 1/2021 | Hong | B25J 11/008 |
| 2021/0046650 A1* | 2/2021 | Deyle | B25J 9/1666 |
| 2021/0086361 A1* | 3/2021 | Huang | B25J 9/1674 |
| 2021/0270858 A1* | 9/2021 | Imai | G01N 35/0099 |
| 2022/0057788 A1* | 2/2022 | Avireddi | G05B 19/41875 |
| 2022/0410391 A1* | 12/2022 | Aparicio | B25J 9/1661 |

OTHER PUBLICATIONS

V. Sukhoy and A. Stoytchev, "Learning to detect the functional components of doorbell buttons using active exploration and multimodal correlation," 2010 10th IEEE-RAS International Conference on Humanoid Robots, Nashville, TN, USA, 2010, pp. 572-579, doi: 10.1109/ICHR.2010.5686327. (Year: 2010).*
Translation of CN-111531531-A (Year: 2020).*

* cited by examiner

SYSTEMS AND METHODS FOR MANIPULATING CONTROL PANELS USING ROBOTIC ARMS BASED ON CONTROL SYSTEM DATA ANALYTICS

CROSS-REFERENCE TO RELATED APPLICATION

This application claims priority to and the benefit of U.S. Provisional Application No. 63/140,447 entitled "Systems and Methods for Manipulating Control Panels Using Robotic Arms Based on Control System Data Analytics," filed Jan. 22, 2021, which is hereby incorporated by reference in its entirety for all purposes.

FIELD OF DISCLOSURE

The present disclosure relates generally to automatically manipulating control panels using robotic arms. More specifically, embodiments of the present disclosure relate to systems and methods for automatically manipulating control panels using robotic arms based on data analytics received from a control system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, a system includes one or more robotic arms and a data analytics server. The data analytics server is configured to receive operational data relating to operation of industrial equipment being controlled by a control system. The data analytics server is also configured to perform data analytics on the operational data. The data analytics server is further configured to determine one or more control signals configured to cause the one or more robotic arms to automatically manipulate one or more control elements of a control panel of the control system. In addition, the data analytics server is configured to automatically transmit the one or more control signals to the one or more robotic arms to cause the one or more robotic arms to automatically manipulate the one or more control elements of the control panel of the control system.

In addition, in certain embodiments, a method includes receiving operational data relating to operation of industrial equipment being controlled by a control system. The method also includes performing data analytics on the operational data. The method further includes determining one or more control signals configured to cause the one or more robotic arms to automatically manipulate one or more control elements of a control panel of the control system. In addition, the method includes automatically transmitting the one or more control signals to the one or more robotic arms to cause the one or more robotic arms to automatically manipulate the one or more control elements of the control panel of the control system.

In addition, in certain embodiments, a data analytics server is configured to receive operational data relating to operation of industrial equipment being controlled by a control system. The data analytics server is also configured to perform data analytics on the operational data. The data analytics server is further configured to determine one or more control signals configured to cause one or more robotic arms to automatically manipulate one or more control elements of a control panel of the control system. In addition, the data analytics server is configured to automatically transmit the one or more control signals to the one or more robotic arms to cause the one or more robotic arms to automatically manipulate the one or more control elements of the control panel of the control system.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

When introducing elements of various embodiments of the present disclosure, the articles "a," "an," and "the" are intended to mean that there are one or more of the elements.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating).

In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment.

In addition, as used herein, the terms "automatic", "automated", "autonomous", and so forth, are intended to describe operations that are performed are caused to be performed, for example, by a computing system (i.e., solely by the computing system, without human intervention). Indeed, although certain operations described herein may not be explicitly described as being performed continuously and/or automatically in substantially real time during operation of the computing system and/or equipment controlled by the computing system, it will be appreciated that these operations may, in fact, be performed continuously and/or automatically in substantially real time during operation of the computing system and/or equipment controlled by the computing system to improve the functionality of the computing system (e.g., by not requiring human intervention, thereby facilitating faster operational decision-making, as well as improving the accuracy of the operational decision-making by, for example, eliminating the potential for human error), as described in greater detail herein.

In addition, as used herein, the term "application" may refer to one or more computing modules, programs, processes, workloads, threads, and/or computing instructions executed by a computing system. Example embodiments of an application include software modules, software objects, software instances, and/or other types of executable code.

The embodiments of the present disclosure are configured to enable automatic manipulation of control elements of a control panel of a control system being used to control industrial equipment using robotic arms based on data analytics performed on operational parameter data of the industrial equipment. In other words, the data analytics are used to determine how to control the robotic arms to cause the robotic arms to physically manipulate the control elements of the control panel of the control system to, for example, ensure that industrial equipment being controlled is functioning as intended, that the industrial equipment being controlled is relatively healthy from a life cycle perspective, and so forth. Specifically, often, certain testing procedures need to be performed for the industrial equipment, which may include implementation of a specific series of control system adjustments and confirmation of corresponding functionality of the industrial equipment being controlled. However, certain obstacles sometimes exist with respect to such testing procedures. For example, one alternative for performing such testing procedures is to directly communicatively couple to software and/or hardware of the control system and/or the control panel of the control system. However, in such scenarios, there may be a certain degree of uncertainty with respect to specific versions of control system software being used, specific controllable variables for the control system, and so forth. Therefore, such direct integration may not be entirely efficient or accurate. Another alternative for performing such testing procedures is to use human operators to perform the desired series of control system adjustments. However, in such scenarios, human operators may not implement the desired series of control system adjustments accurately and/or in a timely fashion. The embodiments described herein overcome the deficiencies of these techniques by utilizing one or more robotic arms to automatically manipulate control elements of a control panel of a control system based at least in part on data analytics performed on operational parameter data of industrial equipment being controlled by the control system.

Figure 1:
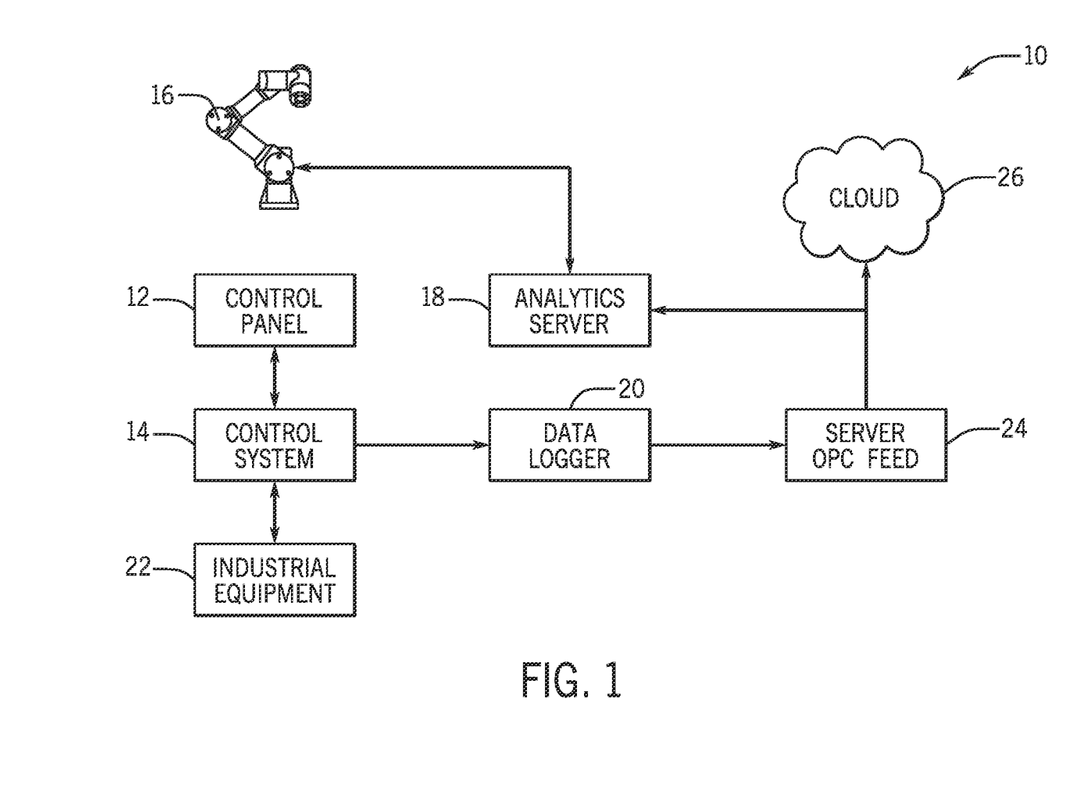
FIG. 1 is a schematic diagram of a system configured to automatically manipulate a control panel of a control system using one or more robotic arm(s) based on inputs received from a data analytics server, in accordance with embodiments the present disclosure.

FIG. 1 is a schematic diagram of a system 10 configured to automatically manipulate a control panel 12 of a control system 14 using one or more robotic arm(s) 16 based on inputs received from a data analytics server 18. In particular, as illustrated in FIG. 1, in certain embodiments, a data logger 20 may be configured to log data relating to operation of a control system 14 controlling industrial equipment 22, and the logged data may be transmitted as a server OLE for process control (OPC) feed 24 to external storage, such as cloud storage 26. In certain embodiments, the data analytics server 18 may receive the server OPC feed 24 and may perform data analytics of the information included in the server OPC feed 24 to determine control signals to be automatically transmitted to the one or more robotic arm(s) 16 for the purpose of automatically controlling the one or more robotic arm(s) 16 to automatically manipulate control elements (e.g., buttons, switches, knobs, levers, and so forth) of the control panel 12 of the control system 14.

More specifically, in certain situations, certain testing procedures may need to be performed for the industrial equipment 22, and these testing procedures may require a specific series of automated manipulations of the control elements of the control panel 12 (e.g., in a particular order, with particular timing, and so forth). As such, the specific series of automated manipulations of the control elements of the control panel 12 may be relatively difficult for a human operator to perform in an efficient and timely manner. Therefore, the data analytics server 18 may be used to perform data analytics of information included in the server OPC feed 24, which relates to operating parameters of the industrial equipment 22 that are caused at least in part by the automated manipulations of the control elements of the control panel 12, and to send appropriate control signals to the one or more robotic arm(s) 16 to cause the one or more robotic arm(s) 16 to automatically manipulate the control elements of the control panel 12 for the purpose of implementing the specific series of automated manipulations of the control elements of the control panel 12 to perform the testing procedures. As such, the data analytics server 18 is configured to monitor data relating to operation of the industrial equipment 22 in substantially real time for the purpose of applying data analytics on the data to automatically manipulate the control elements of the control panel 12.

Figure 2:
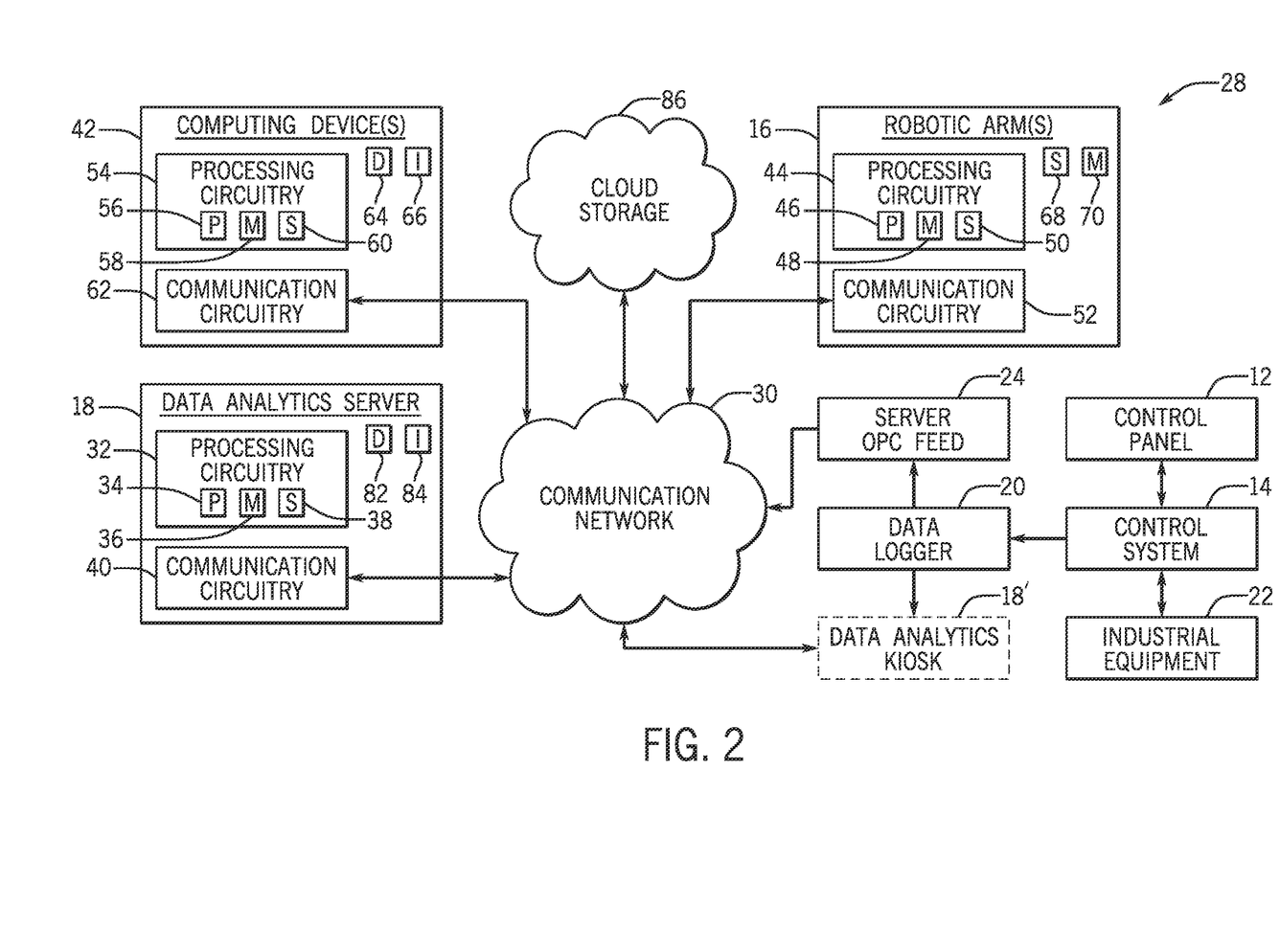
FIG. 2 is a schematic diagram of a data analytics system configured to automatically manipulate one or more robotic arm(s), in accordance with embodiments the present disclosure.

With the foregoing functionalities in mind, FIG. 2 is a schematic diagram of a data analytics system 28 configured to automatically manipulate one or more robotic arm(s) 16, as described in greater detail herein. As illustrated in FIG. 2, real-time operational data relating to operational parameters of the industrial equipment 22 may be generated by the data logger 20 during operation of the industrial equipment 22, and may be transmitted to the data analytics server 18 (e.g., as an OPC feed 24, in certain embodiments), as described in greater detail herein, via a communication network 30. In certain embodiments, the communication network 30 may generally be a wireless communication network. However, in other embodiments, wired communication links may also be used as part of the communication network 30.

In certain embodiments, the data analytics server 18 includes processing circuitry 32 that includes, for example, at least one processor 34, at least one memory medium 36, at least one storage medium 38, or any of a variety of other components that enable the processing circuitry 32 of the data analytics server 18 to carry out the techniques described herein. For example, the at least one processor 34 is configured to execute computer-readable instructions stored in the at least one memory medium 36 and/or the at least one storage medium 38 that, when executed by the at least one processor 34 cause the data analytics server 18 to perform the techniques described herein. In addition, in certain embodiments, the data analytics server 18 may include communication circuitry 40 to facilitate the data analytics server 18 to receive the operational data from the industrial equipment 22 and to communicate with one or more robotic arm(s) 16 and/or one or more other computing device(s) 42 to perform the techniques described herein. In particular, the data analytics server 18 may perform data analytics on the received operational data, and automatically transmit one or more control signals to the one or more robotic arm(s) 16 to automatically manipulate one or more control elements of a control panel 12 of the control system 14, as described in greater detail herein. In certain embodiments, the communication circuitry 40 may be configured to facilitate wireless communication and/or wired communication.

In addition, in certain embodiments, the one or more robotic arm(s) 16 may similarly include processing circuitry 44 that includes, for example, at least one processor 46, at least one memory medium 48, at least one storage medium 50, or any of a variety of other components that enable the processing circuitry 44 of the one or more robotic arm(s) 16 to carry out the techniques described herein. For example, the at least one processor 46 is configured to execute computer-readable instructions stored in the at least one memory medium 48 and/or the at least one storage medium 50 that, when executed by the at least one processor 46 cause the one or more robotic arm(s) 16 to perform the techniques described herein. In addition, in certain embodiments, the one or more robotic arm(s) 16 may include communication circuitry 52 to facilitate the one or more robotic arm(s) 16 to receive the one or more control signals from the data analytics server 18 to automatically manipulate one or more control elements of a control panel 12 of the control system 14, as described in greater detail herein. In certain embodiments, the communication circuitry 52 may be configured to facilitate wireless communication and/or wired communication.

In addition, in certain embodiments, one or more computing device(s) 42 may be used in conjunction with the data analytics server 18 to facilitate the techniques described herein. For example, in certain embodiments, the one or more computing device(s) 42 may be configured to interact with the data analytics server 18 and/or the one or more robotic arm(s) 16 to at least partially control the one or more control signals that are automatically transmitted by the data analytics server 18 to the one or more robotic arm(s) 16 to automatically manipulate one or more control elements of a control panel 12 of the control system 14, as described in greater detail herein. For example, in certain embodiments, the data analytics server 18 may be configured to automatically transmit messages to the one or more computing device(s) 42 when certain data analytics suggest that the industrial equipment 22 being monitored is experiencing a particularly notable operational event (e.g., has lost power, has otherwise stopped operating, and so forth). Indeed, in certain embodiments, the data analytics server 18 may be configured to automatically transmit control signals to the one or more computing device(s) 42 to automatically launch an application being executed on the one or more computing device(s) 42 to notify users about operations of the one or more robotic arm(s) 16 and/or the industrial equipment 22. In certain embodiments, the one or more computing device(s) 42 may include mobile telephones, computing tablets, laptop computers, desktop computers, or any other computing device configured to facilitate interaction with the data analytics server 18 and/or the one or more robotic arm(s) 16, as described in greater detail herein.

In certain embodiments, the one or more computing device(s) 42 may include processing circuitry 54 that includes, for example, at least one processor 56, at least one memory medium 58, at least one storage medium 60, or any of a variety of other components that enable the processing circuitry 54 of the one or more computing device(s) 42 to carry out the techniques described herein. For example, the at least one processor 56 is configured to execute computer-readable instructions stored in the at least one memory medium 58 and/or the at least one storage medium 60 that, when executed by the at least one processor 56 cause the one or more computing device(s) 42 perform the techniques described herein. In addition, in certain embodiments, the one or more computing device(s) 42 may include communication circuitry 62 to facilitate the one or more computing device(s) 42 to communicate with the data analytics server 18 and/or the one or more robotic arm(s) 16, as described in greater detail herein. In certain embodiments, the communication circuitry 62 may be configured to facilitate wireless communication and/or wired communication.

In addition, in certain embodiments, the one or more computing device(s) 42 may be configured to display graphical user interfaces via a display 64 of the one or more computing device(s) 42 (e.g., via an application being executed by the one or more computing device(s) 42) to communicate information relating to the real-time monitoring and analysis of the data analytics performed by the data analytics server 18 on the data relating to operational parameters of the industrial equipment 22, as described in greater detail herein. In addition, in certain embodiments, the one or more computing device(s) 42 may include one or more input device(s) 66 configured to facilitate operators making inputs to the one or more computing device(s) 42 for the purpose of communicating information to the data analytics server 18 and/or the one or more robotic arm(s) 16, as described in greater detail herein.

As described in greater detail herein, the data analytics server 18 is configured to monitor operations of the industrial equipment 22 in substantially real-time, and to automatically transmit control signals to one or more robotic arm(s) 16 to cause the one or more robotic arm(s) 16 to automatically manipulate one or more control elements of a control panel 12 of the control system 14 based at least in part on data analytics performed on the real-time monitored data. In certain embodiments, an expert system is designed to efficiently monitor all of the trends of a control system 14 associated with the industrial equipment 22 and data analytics results performed by the data analytics server 18. In certain embodiments, the real-time monitoring data may be secured with two-factor authentication. The data analytics server 18 enables continuous surveillance and trending of the operational data of the industrial equipment 22, as described in greater detail herein. In addition, in certain embodiments, the data analytics server 18 may provide communication with operators at a worksite regarding observed issues associated with the industrial equipment 22 via, for example, one or more computing device(s) 42.

In addition, in certain embodiments, the data analytics server 18 may also provide a custom-built system to track and follow-up on all observed issues associated with the industrial equipment 22. In particular, a variety of documented issues may be tracked over time including, but not limited to, equipment health statuses, equipment failures, observations of equipment functionality, original equipment manufacturer (OEM) communications, equipment test histories, and so forth. In certain embodiments, the data analytics server 18 may also be configured to provide reliability metrics for the industrial equipment 22 based at least in part on the data analytics performed by the data analytics server 18. In addition, in certain embodiments, the data analytics server 18 may also be configured to generate documentation, schematics, and certifications relating to the industrial equipment 22 based at least in part on the data analytics performed by the data analytics server 18.

In addition, in certain embodiments, the data analytics server 18 may also be configured to determine fault trees for the industrial equipment 22 to enable assessment of the effect of all ongoing issues relating to availability and compliance of the industrial equipment 22. In particular, in certain embodiments, thousands of component models relating to the industrial equipment 22 may be used by the data analytics server 18. In certain embodiments, the data analytics server 18 may also be configured to provide automatic reporting for regulatory submissions relating to the industrial equipment 22.

In addition, in certain embodiments, the data analytics server 18 may also be configured to track operational efficiency of the industrial equipment 22. For example, in certain embodiments key performance indicators (KPIs) and timelines may be tracked in substantially real-time to enable monitoring of real-time operational statuses of the industrial equipment 22. In addition, in certain embodiments, the data analytics server 18 enables evaluation of testing performance.

In addition, in certain embodiments, the data analytics server 18 may also be configured to generate a variety of automated reports to clients, management, and regulatory agencies. For example, in certain embodiments, the data analytics server 18 may be configured to automatically generate analysis reports, digital testing reports, periodic regulatory reports (e.g., quarterly Bureau of Safety and Environmental Enforcement (BSEE) reports), among other reports.

In addition, in certain embodiments, the data analytics server 18 may also be configured to provide maintenance tracking and optimization relating to the industrial equipment 22 to enable users to follow maintenance activities for the industrial equipment 22 and drive condition-based maintenance for the industrial equipment 22 through the data analytics described herein. For example, in certain embodiments, the data analytics server 18 may enable real-time tracking of maintenance tasks for the industrial equipment 22 and may perform maintenance optimization analyses (MOA) for the equipment to, for example, provide a digital maintenance map.

In addition, in certain embodiments, the data analytics server 18 may also be configured to provide component-level health monitoring that tracks components of the industrial equipment 22 to, for example, detect deviations from expected operational parameters. As such, degradation of the industrial equipment 22 may be tracked and isolated for each individual component of the industrial equipment 22. In certain embodiments, results of this analysis may be correlated to observed failures and may be used as the basis for condition-based maintenance for the industrial equipment 22.

In addition, in certain embodiments, the data analytics server 18 may also be configured to provide custom-built event management that captures real-time events including analytic results, as described in greater detail herein. For example, in certain embodiments, real-time alerts may be generated based on events that are automatically detected by the data analytics server 18. As such, the data analytics server 18 may be configured to capture health and operational events for the industrial equipment 22 and to, for example, provide automatic prioritization of the events.

Each of these types of data analytics may be performed by the data analytics server 18 for the purpose of automatically transmitting control signals to one or more robotic arm(s) 16 to cause the one or more robotic arm(s) 16 to automatically manipulate one or more control elements of a control panel 12 of the control system 14 based at least in part on data analytics. For example, in certain embodiments, the data analytics server 18 may receive real-time operational data from pressure sensors, temperature sensors, valve positions, and so forth, and may use physics-based models to perform any and all of the data analytics described above for the purpose of determining when and how to automatically manipulate one or more control elements of a control panel 12 of the control system 14 based at least in part on the data analytics. As but one non-limiting example, in certain situations, the data analytics server 18 may perform data analytics tied to pressure trends and valve closures such that, for example, when a determination is made by the data analytics server 18 that a hydraulic valve has been fully closed, then the data analytics server 18 may transmit a control signal to a robotic arm 16 to automatically manipulate a control element of a control panel 12 of the control system 14 to perform a next step in a predetermined series of operating steps.

The industrial equipment 22 being monitored and analyzed in real-time, as described in greater detail herein, may include any type of industrial equipment 22 configured to generate data relating to its operation. For example, the industrial equipment 22 may include motors, pumps, compressors, electrical generators, heat exchangers, heating, ventilation, and air conditioning (HVAC) systems, blowers, fans, mixers/blenders, centrifuges, material handling equipment, valves, drilling rigs and other drilling equipment, and well control equipment (e.g., including blowout preventers (BOPs)), among other equipment.

Figure 3:
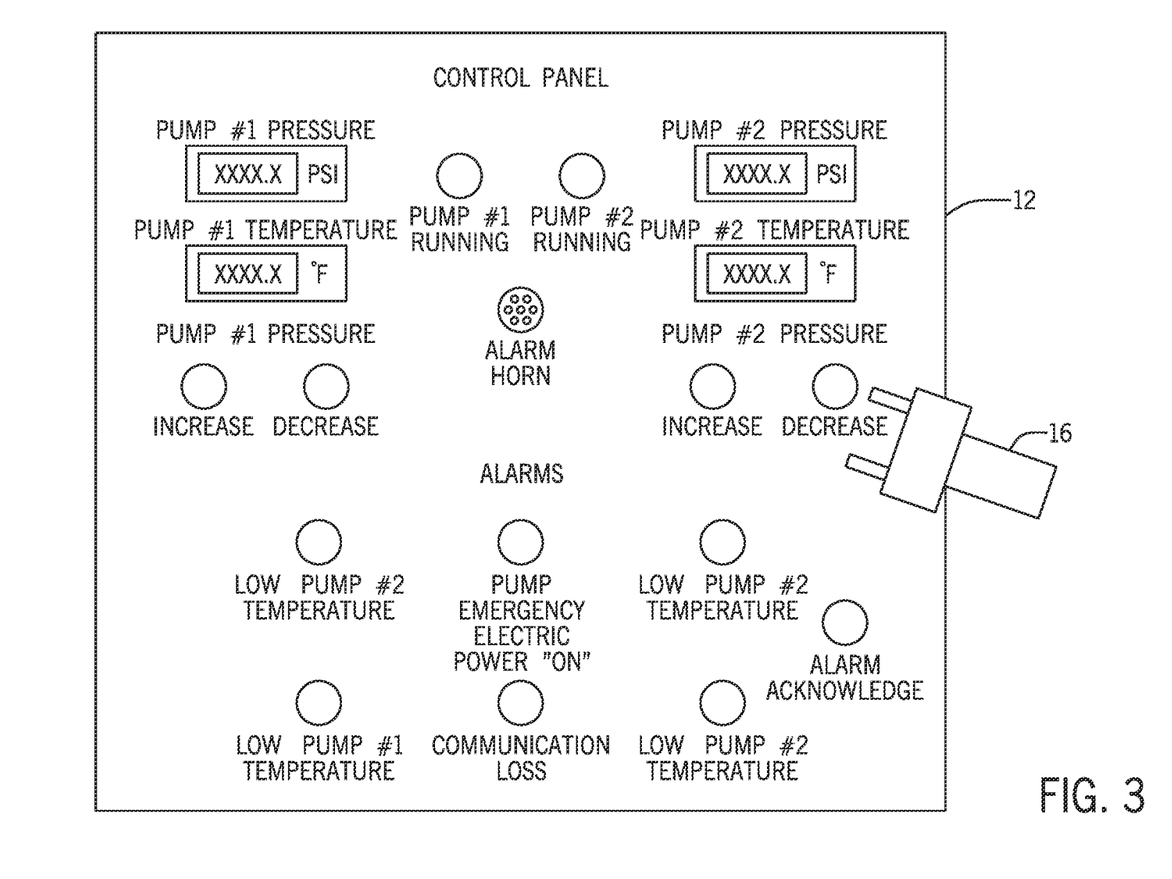
FIG. 3 illustrates portions of an example control panel that includes various control elements that may be automatically manipulated by one or more robotic arm(s) based on control signals received from a data analytics server, in accordance with embodiments the present disclosure.

As described herein, the data analytics server 18 may be configured to perform data analytics on the information included in the server OPC feed 24, which relates to operating parameters of the industrial equipment 22 being controlled by the control system 14, and to send control signals to the one or more robotic arm(s) 16 to cause the one or more robotic arm(s) 16 to automatically manipulate certain control elements of the control panel 12 of the control system 14. FIG. 3 illustrates portions of an example control panel 12 that includes various control elements that may be automatically manipulated by the one or more robotic arm(s) 16 based on the control signals received from the data analytics server 18. It is noted that while the control panel 12 illustrated in FIG. 3 is for use in controlling pressure of pumps, any control panel 12 may utilize the techniques described herein.

As illustrated in FIG. 3, in certain embodiments, the control panel 12 may include a plurality of buttons that may pushed by the one or more robotic arm(s) 16 to cause certain pump-related functions to occur. For example, as illustrated in FIG. 3, in certain embodiments, the plurality of buttons may include buttons for increasing or decreasing pressure of the pumps, acknowledging alarms, and so forth. In addition, in certain embodiments, the control panel 12 may also include a plurality of alarm indicators, which may include whether the pumps are running, when there are low pump pressures and/or temperatures, whether there has been a communication loss, and so forth. In addition, in certain embodiments, the control panel 12 may include an alarm horn for creating audible sounds when certain alarms occur.

Returning now to FIG. 2, since the control panel 12 may include visual and audible indicators configured to indicate certain operating parameters and alarms that occur during operation of the industrial equipment 22 being controlled by the control system 14 with which the control panel 12 cooperates, in certain embodiments, the one or more robotic arm(s) 16 may include, or otherwise be associated with, sensors 68 (e.g., such as cameras, audio sensors, and so forth) configured to detect the visual and audible indicators of the control panel 12, and to transmit data relating to the visual and audible indicators of the control panel 12 to the data analytics server 18 to enable the data analytics server 18 to perform the data analytics based at least in part on the detection of the visual and audible indicators of the control panel 12.

In addition, in certain embodiments, the one or more robotic arm(s) 16 may be associated with monitoring sensors 70 (e.g., such as cameras, audio sensors, and so forth) configured to directly monitor the functionality of the one or more robotic arm(s) 16 to, for example, enable real-time monitoring of the performance of the one or more robotic arm(s) 16. For example, in certain embodiments, the monitoring sensors 70 may allow personnel from a real-time monitoring center to observe the operation of the one or more robotic arm(s) 16 remotely. In addition, in other embodiments, the monitoring sensors 70 may be used by the data analytics server 18 to confirm that certain manipulations of control elements of the control panel 12 have actually occurred. In addition, in such embodiments, when the data analytics server 18 determines that the one or more robotic arm(s) 16 did not, in fact, cause the desired manipulations of the control elements of the control panel 12, the data analytics server 18 may be configured to determine and implement a corrective action (e.g., to cause the manipulation to be attempted again, to determine that the manipulation is no longer needed, and so forth). It will be appreciated that, in certain embodiments, the monitoring sensors 70 may also enable the data analytics server 18 to determine a cause of the desired manipulations not being performed by the one or more robotic arm(s) 16 (e.g., that an object is blocking certain control elements of the control panel 12), and to automatically transmit an alert to an operator (e.g., via the data analytics kiosk 18', a computing device 42, and so forth).

Figure 4:
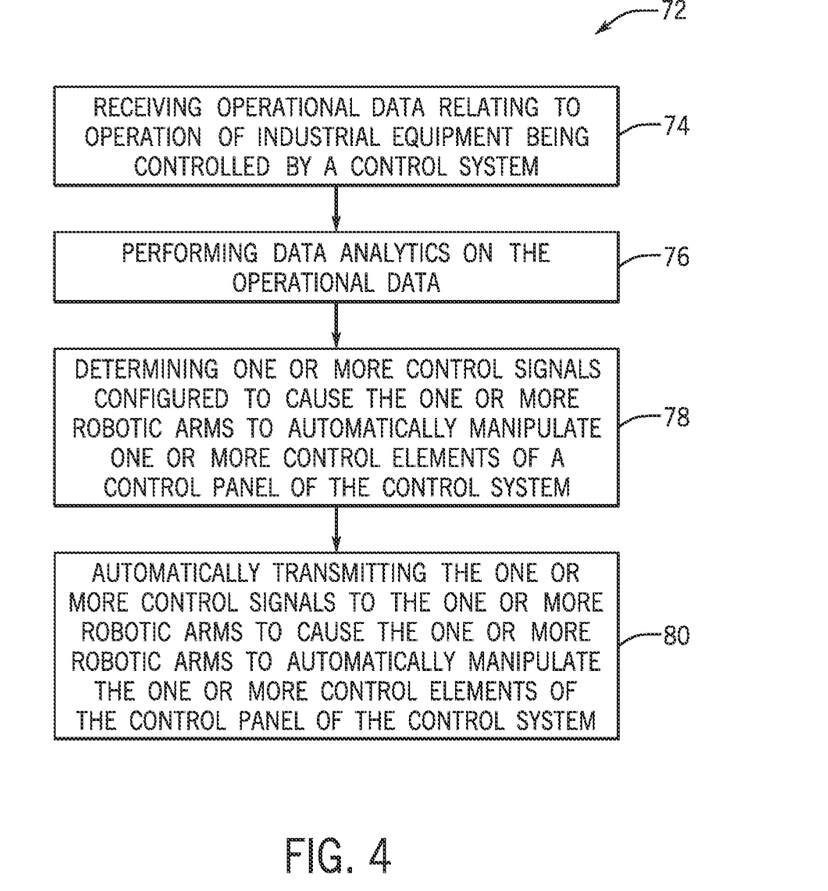
FIG. 4 is a block diagram of a method for utilizing the data analytics server, in accordance with embodiments the present disclosure.

FIG. 4 is a block diagram of a method 72 for utilizing the data analytics server 18 described herein. As illustrated in FIG. 4, in certain embodiments, the method 72 includes receiving operational data relating to operation of industrial equipment 22 being controlled by the control system 14 (block 74). In addition, in certain embodiments, the method 72 includes performing data analytics on the operational data (block 76). In addition, in certain embodiments, the method 72 includes determining one or more control signals configured to cause the one or more robotic arm(s) 16 to automatically manipulate one or more control elements (e.g., as illustrated in FIG. 3) of the control panel 12 of the control system 14 (block 78). In addition, in certain embodiments, the method 72 includes automatically transmitting the one or more control signals to the one or more robotic arm(s) 16 to cause the one or more robotic arm(s) 16 to automatically manipulate the one or more control elements (e.g., as illustrated in FIG. 3) of the control panel 12 of the control system 14 (block 80).

Figure 5:
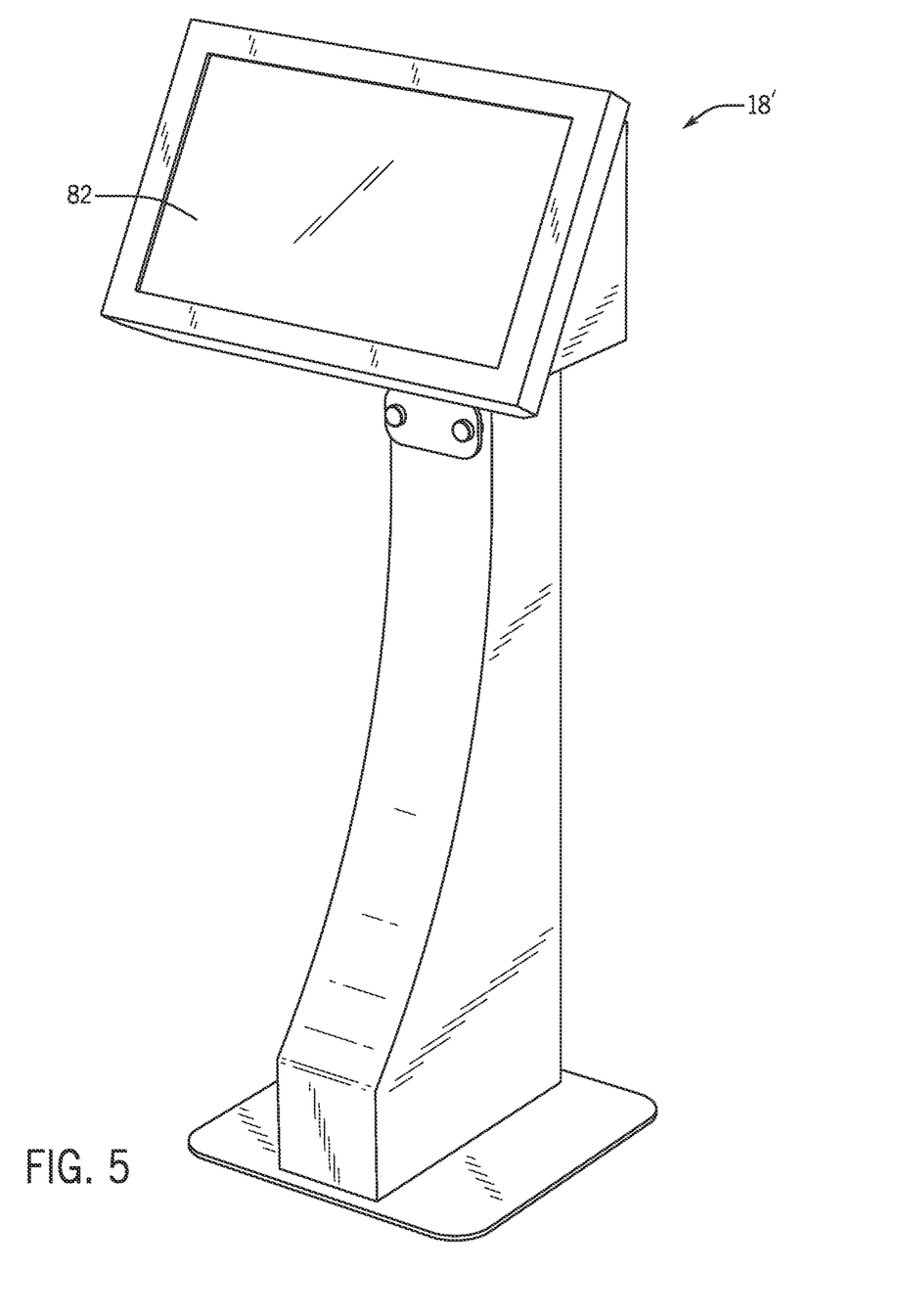
FIG. 5 is a perspective view of a data analytics kiosk, in accordance with embodiments the present disclosure.

Returning now to FIG. 2, in certain embodiments, the data analytics server 18 may take the form of a data analytics kiosk 18' located at or near a worksite that includes the industrial equipment 22, the control system 14 and associated control panels 12, the robotic arms 16, and so forth, and which includes substantially similar components as the data analytics server 18. As such, in certain embodiments, the data analytics kiosk 18' may be configured to display graphical user interfaces via a display 82 of the data analytics kiosk 18' (e.g., via an application being executed by the data analytics kiosk 18') to communicate information relating to the real-time monitoring and analysis of the data analytics performed by the data analytics kiosk 18' on the data relating to operational parameters of the industrial equipment 22, as described in greater detail herein. In addition, in certain embodiments, the data analytics kiosk 18' may include one or more input device(s) 84 configured to facilitate operators making inputs to the data analytics kiosk 18' for the purpose of communicating information to the data analytics kiosk 18' and/or the one or more robotic arm(s) 16, as described in greater detail herein. FIG. 5 is a perspective view of such a data analytics kiosk 18'. In general, having the data analytics kiosk 18' located at or near a worksite that includes the industrial equipment 22 can prove to be convenient for operators located at the worksite to enable them to monitor the automated operation of the robotic arms 16 described in greater detail herein.

However, returning now to FIG. 2, in other embodiments, both a remotely-located data analytics server 18 (e.g., not located at the worksite or even in the vicinity of the worksite) and a locally positioned data analytics kiosk 18' may be used in combination with each other. In such embodiments, the data analytics kiosk 18' may be configured to perform many of the functionalities of the data analytics server 18, and may simply provide a convenient analytics terminal at the worksite for equipment operators, as described in greater detail herein. Indeed, in certain embodiments, the real-time operational data relating to the operational parameters of the industrial equipment 22 may be transmitted to the data analytics kiosk 18' via a local communication network that controls communications at the worksite. In other words, in certain embodiments, the real-time operational data for the industrial equipment 22 may be transmitted, in parallel, both to the data analytics server 18 (e.g., as an OPC feed 24), which is located remotely from the worksite, via the communication network 30, and to the data analytics kiosk 18', which is located locally on the worksite, via the local communication network. As such, if one of the networks experiences downtime, the other network may continue to transmit the real-time operational data to one or both of the data analytics server 18 and the data analytics kiosk 18', thereby providing redundancy of the transmission of the real-time operational data. In such embodiments, the data analytics server 18 and the data analytics kiosk 18' may be configured to periodically synchronize the real-time operational data collected by the respective devices. Indeed, in certain embodiments, the data analytics server 18 and the data analytics kiosk 18' may be configured to store the real-time operational data in cloud storage 86 provided by the communication network 30. In addition, the data analytics kiosk 18', as well as the one or more computing devices 42, may be configured to display graphical user interfaces that include data, tables, graphs, and so forth relating to operation and automated manipulation (e.g., via the robotic arms 16) of the industrial equipment 22, as described in greater detail herein.

It will be appreciated that the data analytics server 18 may need to communicate with the robotic arms 16, the data analytics kiosk 18', the OPC feed 24, the computing devices 42, and other computing devices and services (e.g., the cloud storage 86) using various different communication protocols and/or data formats. As such, in certain embodiments, the data analytics server 18 may be configured to convert data received by the data analytics server 18 into a standardized format that is usable by the data analytics server 18 to perform the data analytics functions, and so forth, as described in greater detail herein. In addition, in certain embodiments, the data analytics server 18 may be configured to convert standardized data used by the data analytics server 18 into other communication protocols and/or data formats for the purpose of transmitting, for example, control signals to the robotic arms 16, communication signals to the data analytics kiosk 18' and the data analytics kiosk 18', and so forth, as described in greater detail herein.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A system, comprising:
one or more robotic arms comprising one or more sensors configured to detect visual and audible indicators of a control panel of a control system controlling operation of drilling or well control equipment; and
a data analytics server configured to:
receive operational data relating to the operation of the drilling or well control equipment being controlled by the control system;
receive feedback data relating to the visual and audible indicators of the control panel of the control system controlling operation of the drilling or well control equipment;
perform data analytics on the operational data relating to the operation of the drilling or well control equipment being controlled by the control system and the feedback data relating to the visual and audible indicators of the control panel of the control system controlling operation of the drilling or well control equipment;
determine one or more control signals configured to cause the one or more robotic arms to automatically manipulate one or more control elements of a control panel of the control system in accordance with the data analytics; and
automatically transmit the one or more control signals to the one or more robotic arms to cause the one or more robotic arms to automatically manipulate the one or more control elements of the control panel of the control system.

2. The system of claim 1, wherein the data analytics server is configured to perform the data analytics on the operational data in substantially real time during the operation of the drilling or well control industrial equipment.

3. The system of claim 1, wherein the data analytics server is a data analytics kiosk located at a worksite that includes the drilling or well control equipment.

4. The system of claim 1, wherein the data analytics server is located remotely from a worksite that includes the drilling or well control equipment.

5. The system of claim 1, wherein the one or more robotic arms comprise one or more monitoring sensors configured to directly monitor functionality of the one or more robotic arms to enable real-time monitoring of performance of the one or more robotic arms.

6. The system of claim 1, wherein the one or more control elements of the control panel of the control system comprises buttons, switches, knobs, levers, or some combination thereof.

7. A method, comprising:
detecting, via one or more sensors of one or more robotic arms, visual and audible indicators of a control panel of a control system controlling operation of drilling or well control equipment;
receiving, via a data analytics server, operational data relating to the operation of the drilling or well control equipment being controlled by the control system;
receiving, via the data analytics server, feedback data relating to the visual and audible indicators of the control panel of the control system controlling operation of the drilling or well control equipment;
performing, via the data analytics server, data analytics on the operational data relating to the operation of the drilling or well control equipment being controlled by the control system and the feedback data relating to the visual and audible indicators of the control panel of the control system controlling operation of the drilling or well control equipment;

determining, via the data analytics server, one or more control signals configured to cause one or more robotic arms to automatically manipulate one or more control elements of a control panel of the control system in accordance with the data analytics; and automatically, via the data analytics server, transmitting the one or more control signals to the one or more robotic arms to cause the one or more robotic arms to automatically manipulate the one or more control elements of the control panel of the control system.

8. The method of claim 7, comprising performing, via the data analytics server, the data analytics on the operational data in substantially real time during the operation of the drilling or well control equipment.

9. The method of claim 7, wherein the data analytics server is a data analytics kiosk located at a worksite that includes the drilling or well control equipment.

10. The method of claim 7, wherein the data analytics server is located remotely from a worksite that includes the drilling or well control equipment.

11. The method of claim 7, comprising monitoring, via the data analytics server, performance of the one or more robotic arms using data detected by one or more monitoring sensors associated with the one or more robotic arms.

12. The method of claim 7, wherein the one or more control elements of the control panel of the control system comprises buttons, switches, knobs, levers, or some combination thereof.

13. A data analytics server configured to:

receive operational data relating to operation of drilling or well control equipment being controlled by a control system;

receive, from one or more sensors of one or more robotic arms, feedback data relating to visual and audible indicators of a control panel of the control system controlling operation of the drilling or well control equipment;

perform data analytics on the operational data relating to the operation of the drilling or well control equipment being controlled by the control system and the feedback data relating to the visual and audible indicators of the control panel of the control system controlling operation of the drilling or well control equipment;

determine one or more control signals configured to cause one or more robotic arms to automatically manipulate one or more control elements of a control panel of the control system in accordance with the data analytics; and automatically transmit the one or more control signals to the one or more robotic arms to cause the one or more robotic arms to automatically manipulate the one or more control elements of the control panel of the control system.

14. The data analytics server of claim 13, wherein the data analytics server is configured to perform the data analytics on the operational data in substantially real time during the operation of the drilling or well control equipment.

15. The data analytics server of claim 13, wherein the data analytics server is a data analytics kiosk located at a worksite that includes the drilling or well control equipment.

16. The data analytics server of claim 13, wherein the data analytics server is located remotely from a worksite that includes the drilling or well control equipment.

17. The data analytics server of claim 13, wherein the data analytics server is configured to monitor performance of the one or more robotic arms using data detected by one or more monitoring sensors associated with the one or more robotic arms.

* * * * *